United States Patent
Engel et al.

(10) Patent No.: US 9,472,808 B2
(45) Date of Patent: Oct. 18, 2016

(54) METHOD FOR MANUFACTURING A FUNCTIONAL LAYER FOR A LITHIUM CELL

(71) Applicant: Robert Bosch GmbH, Stuttgart (DE)

(72) Inventors: Christine Engel, Vaihingen/Enz Ensingen (DE); Michael Butzin, Bad Staffelstein (DE); Martin Tenzer, Neurtingen (DE); Jean Fanous, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/570,042

(22) Filed: Dec. 15, 2014

(65) Prior Publication Data

US 2015/0171430 A1    Jun. 18, 2015

(30) Foreign Application Priority Data

Dec. 16, 2013  (DE) .................. 10 2013 226 064

(51) Int. Cl.
| | |
|---|---|
| *H01M 4/13* | (2010.01) |
| *H01M 4/62* | (2006.01) |
| *H01M 4/04* | (2006.01) |
| *H01M 4/139* | (2010.01) |
| *H01M 4/36* | (2006.01) |
| *H01M 10/42* | (2006.01) |

(52) U.S. Cl.
CPC ........... *H01M 4/628* (2013.01); *H01M 4/0402* (2013.01); *H01M 4/0419* (2013.01); *H01M 4/0435* (2013.01); *H01M 4/13* (2013.01); *H01M 4/139* (2013.01); *H01M 4/366* (2013.01); *H01M 10/4235* (2013.01); *Y02E 60/122* (2013.01); *Y02P 70/54* (2015.11)

(58) Field of Classification Search
CPC ......... H01M 10/0525; H01M 4/0402; H01M 4/0419; H01M 4/0435; H01M 4/139; H01M 4/628
See application file for complete search history.

(56) References Cited

U.S. PATENT DOCUMENTS

| | | | | |
|---|---|---|---|---|
| 2006/0046149 A1* | 3/2006 | Yong | ..................... | H01M 2/166 429/251 |
| 2007/0082261 A1* | 4/2007 | Lee | ....................... | H01M 2/145 429/144 |
| 2010/0261069 A1* | 10/2010 | Nakura | ............... | H01M 2/1653 429/338 |
| 2010/0330410 A1* | 12/2010 | Takahashi | .......... | H01M 2/1646 429/129 |
| 2012/0107667 A1* | 5/2012 | Jeong | ..................... | C01G 53/50 429/145 |

* cited by examiner

*Primary Examiner* — Patrick Ryan
*Assistant Examiner* — Ben Lewis
(74) *Attorney, Agent, or Firm* — Norton Rose Fulbright US LLP

(57) ABSTRACT

In a method for manufacturing a functional layer for a lithium cell, e.g., a protective layer for a lithium metal anode, the functional layer being lithium-ion conductive and including particles of at least one ceramic material, the particles of the at least one ceramic material being applied to a carrier by deposition.

12 Claims, 1 Drawing Sheet

METHOD FOR MANUFACTURING A FUNCTIONAL LAYER FOR A LITHIUM CELL

FIELD OF THE INVENTION

1. Description of the Related Art

The present invention relates to a method for manufacturing a functional layer for a lithium cell, e.g., a protective layer for a lithium metal anode or a lithium metal cathode, a functional layer for a lithium cell or lithium battery as well as a lithium cell or lithium battery including the functional layer.

2. Description of the Related Art

In various types of lithium (Li) batteries, in particular the so-called post lithium-ion batteries, for example, Li-sulfur batteries or Li-oxygen batteries, a metallic lithium anode is used as an anode. Among other things, this entails the problem that parasitic reactions take place on it with the electrolyte or substances contained in it (for example, polysulfides in the case of an Li—S cell). As a result, both the electrolyte as well as the lithium itself is used up. To prevent this, a protective layer is required on the metallic lithium anode which prevents direct contact between metallic lithium and electrolyte and simultaneously has an adequately high lithium-ion conductivity.

Presently, most concepts start with a layer which is stable against dendrite growth, which prevents growing dendrites from growing through this layer. A high mechanical stability is necessary for that. This may be achieved, for example, by ceramic materials, which, however, may not be used alone due to their brittleness.

BRIEF SUMMARY OF THE INVENTION

The method according to the present invention offers the advantage that a functional layer for a lithium cell, in particular a functional layer for a lithium metal anode or a lithium metal cathode may be manufactured, which is both flexible for Li-ions and is also stable against dendrites.

A lithium cell may in particular be understood to be an electrochemical cell whose anode (negative electrode) includes lithium. For example, a lithium metal cell may be a cell including an anode (negative electrode) made from metallic lithium or a lithium alloy, or, if necessary, a lithium-ion cell, a cell whose anode includes an intercalation material, for example, graphite, into which lithium may be reversibly deposited and removed.

It is advantageous if an aerosol deposition method (ADM method) is used for depositing the particles of the at least one inorganic material and the polymeric binder onto the carrier. The deposition parameters for the aerosol deposition may, for example, be as follows:

Powder distribution of the starting powder: 50 nm-5 μm (d50=1 μm-3 μm)
Vibration frequency for aerosol production: 80 rpm-800 rpm
Nozzle opening: 0.5*10 mm$^2$
Nozzle type: Laval nozzle
Carrier gas flow rate: 1.5 l/min-6 l/min
Carrier gas type: argon, ammonia, nitrogen
Pressure difference (between deposition chamber and aerosol generator): 80 mbar-180 mbar
Nozzle distance to substrate: 3 mm-15 mm
Scanning speed (pass speed): 0.1 mm/s-3 mm/s
Number of passes: 1-60
Layer thicknesses: 0.5 μm-20 μm.

The ADM method makes it possible to deposit the particles of the at least one inorganic material in pulverized form as a layer on the carrier, as a result of which very low porosities, for example, in the range of smaller than or equal to 10%, in particular smaller than or equal to 2%, especially 0%, may be achieved. This measure is used for the complete separation of anode and electrolyte in a cell having an anode protective layer or the complete separation of cathode and electrolyte in a cell having a cathode protective layer (dendrite growth, electrolyte decomposition).

It is further advantageous if the particles of the at least one inorganic material and the polymeric binder are deposited simultaneously or in alternation. As a result, the functional layer obtains high flexibility, since a composite is produced in which the polymer chains act as binders for the ceramic particles.

It is furthermore advantageous if the functional layer is formed without an additional tempering step. This means in other words that later tempering or secondary sintering is omitted, which is necessary in the case of conventional materials, for example, lithium lanthanum titanium oxide (LLTO), lithium lanthanum titanium phosphate (LATP), garnets, such as lithium lanthanum zirconium oxide (LLZ), after the production of a layer for forming particle contacts for reducing the contact resistance from one to the next particle and consequently for ensuring an adequately high lithium conductivity. This in turn makes it possible to produce the functional layer at lower temperatures, in particular at temperatures above the melting temperature of glass, but below the melting temperature of the polymer, typically at approximately 150° C. The advantage here is that the amorphous areas of the polymer may be reoriented and the used polymeric binder is not burned out, thus improving the mechanical stability of the functional layer and increasing the flexibility of the functional layer.

It is furthermore advantageous if the functional layer is compacted. In particular, a calendering process may be used for this compacting. The compacting may, for example, be carried out with the aid of a compacter, for example, a calender. Advantageously, the compacting process may be used to produce a dense functional layer and, in particular, any previously formed pores may be closed. Furthermore, the compacting may advantageously improve the contact between the individual particles. This in turn has the result that the contact resistances are minimized and the lithium conductivity and the specific energy density are increased.

Furthermore, it is advantageous if the polymeric binder is lithium-ion conductive and/or the particles of the inorganic material form uninterrupted lithium-ion conduction paths in the thickness direction of the functional layer and/or the functional layer includes at least one lithium conducting salt. The lithium conducting salt may be selected from the group including lithium hexafluorophosphate (LiPF$_6$), lithium bis (trifluoromethanesulfonyl)imide (LiTFSI), lithium tetrafluoroborate (LiBF$_4$), lithium bis(oxalato)borate, sulfide electrolytes, argyrodites, Li-rich anti-perovskites, Li-lanthanum perovskites, and mixtures thereof. This further increases the conductivity of the functional layer for lithium ions.

It is further advantageous if the lithium conducting salt together with the particles of the at least one inorganic material and the polymeric binder are applied to the carrier by deposition. This makes it possible to also apply the lithium conducting salt—together with the particles of the at least one inorganic material and the polymeric binder—as a third component to the carrier with the aid of ADM in a fast and cost-effective manner.

Alternatively, the lithium conducting salt may also be introduced into the functional layer after the deposition of the particles of the at least one inorganic material and the polymeric binder.

It is further advantageous if the carrier includes lithium and is formed in particular as a lithium film. This advantageously makes it possible to omit an additional process step or additional process steps for the application of the functional layer onto the lithium.

Alternatively, however, the carrier may also be formed as a carrier substrate, from which the functional layer is removed, in particular with the aid of a delaminating or etching process. Subsequently, the functional layer is applied to a lithium film, for example, with the aid of a calendering process.

The present invention will be explained in greater detail below by way of example with reference to the appended drawings.

DETAILED DESCRIPTION OF THE INVENTION

Figure 1:
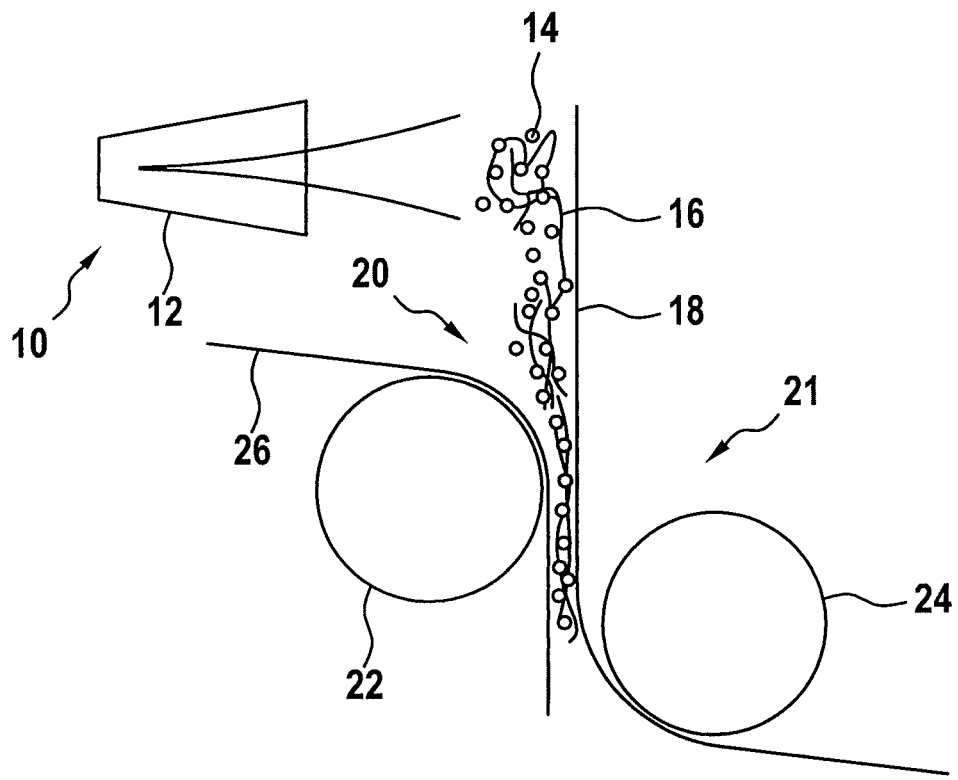
FIG. 1 shows a schematic representation of the method according to one exemplary embodiment of the present invention.

In the following description of preferred exemplary embodiments of the present invention, identical or similar reference numerals are used for the elements shown in the different figures and elements acting in a similar way, a repeated description of these elements being omitted.

Shown in FIG. 1 is an aerosol coating device 10, via which the method according to the present invention may be carried out or the functional layer according to the present invention may be produced. Aerosol coating device 10 has a nozzle 12 which may be designed, for example, as a Laval nozzle. The nozzle opening of nozzle 12 may, for example, amount to 0.5*10 mm². Aerosol coating device 10 may in particular be designed for implementing the above-described deposition parameters for the aerosol deposition.

According to the shown method according to the present invention, particles 14 of at least one inorganic, in particular ceramic material and at least one polymeric binder 16 are applied to a carrier 18 by deposition. The deposition is in this case an aerosol deposition. Particles 14 of the at least one inorganic, in particular ceramic material and the polymeric binder may be deposited simultaneously or in alternation with the aide of aerosol coating device 10. As is apparent from FIG. 1, particles 14 and binder 16 form a composite on carrier 18, resulting in the formation of a functional layer 20.

To make functional layer 20 manageable and improve the contact between individual particles 14, functional layer 20 is compacted after the deposition with the aid of a compacter 21. Compacter 21 is in this case designed as a calender 21 which has a first roller 22 and a second roller 24. As is further apparent from FIG. 1, first roller 22 is used for guiding a lithium film 26 in such a way that functional layer 20 is applied to it. Second roller 24 situated diametrically opposed to first roller 22 is in turn used for guiding carrier 18 in such a way that it is removed from functional layer 20. The layered composite created in this way thus has functional layer 20 according to the present invention and a lithium layer 26, which is formed as lithium film 26. As explained above, it is alternatively conceivable that carrier 18 includes lithium and is formed in particular as a lithium film. This advantageously makes it possible to omit the delaminating step, via which carrier 18 is removed from functional layer 20.

Figure 2:
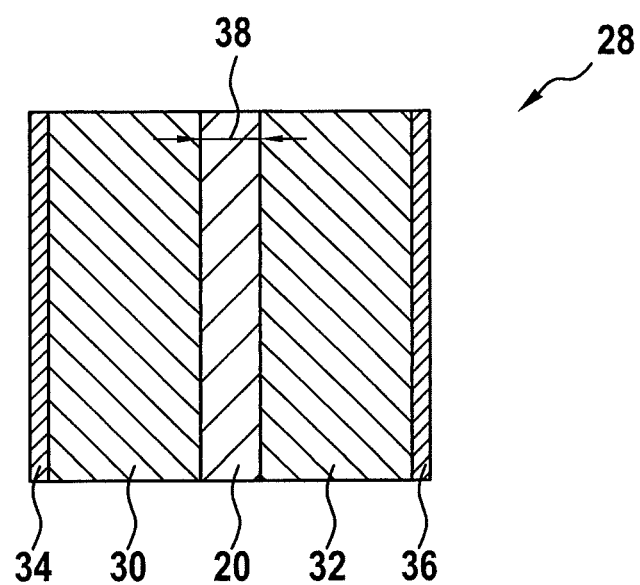
FIG. 2 shows a schematic cross section through one specific embodiment of a lithium cell according to the present invention.

FIG. 2 shows a lithium cell 28 which has an anode 30 (negative electrode) and a cathode 32 (positive electrode). Moreover, an anode current collector 34, made from copper, for example, is situated on the outside of anode 30, and a cathode current collector 36, made from aluminum, for example, is situated on the outside of cathode 32.

Situated between anode 30 and cathode 32 is functional layer 20 according to the present invention, which advantageously may be used as protective layer 20 for anode 30 or for cathode 32, in particular for avoiding a dendrite growth from anode 30. Protective layer 20 may consequently also be referred to as anode protective layer 20 or cathode protective layer 20. Moreover, functional layer 20 is used as a sole separator in the specific embodiment shown in FIG. 2. This also advantageously makes it possible to achieve a high specific energy density.

Anode 30 may also be a lithium metal anode 30, i.e., an anode including a metallic lithium or a lithium alloy or formed from it. The cathode may, for example, include sulfur or be an oxygen electrode. For example, lithium cell 28 shown in FIG. 2 may be a lithium-sulfur cell or a lithium-oxygen cell. For example, the lithium cell shown in FIG. 2 may be formed as a dry cell or a thin film cell.

What is claimed is:

1. A method for manufacturing a lithium-ion conductive functional layer for a lithium cell, comprising:
    applying particles of at least one ceramic material to a carrier by depositions;
    wherein the functional layer further includes at least one polymeric binder applied to the carrier by deposition,
    wherein the particles of the at least one ceramic material and the polymeric binder are deposited one of simultaneously or in alternation,
    wherein at least one of (i) the polymeric binder is lithium-ion conductive, (ii) the particles of the at least one ceramic material form uninterrupted lithium-ion conduction paths in the thickness direction of the functional layer, and (iii) the functional layer includes at least one lithium conducting salt,
    wherein the lithium conducting salt includes at least one of lithium hexafluorophosphate (LiPF$_6$), lithium bis (trifluoromethanesulfonyl)imide (LiTFSI), lithium tetrafluoroborate (LiBF$_4$), and lithium bis(oxalato)borate,
    wherein the lithium conducting salt is introduced into the functional layer after the deposition of the particles of the at least one ceramic material and the polymeric binder, and
    wherein the carrier is a carrier substrate which is removed from the functional layer with the aid of a delaminating or etching process, and wherein the functional layer is subsequently applied to a lithium film.

2. The method as recited in claim 1, wherein an aerosol deposition method is used for the deposition of at least one of the at least one ceramic material and the polymeric binder.

3. The method as recited in claim 1, wherein (i) the polymeric binder includes at least one of polyethylene oxide, polyethylene oxide derivatives, polyacrylates, and polyacrylate derivatives, and (ii) the ceramic material includes at least one of lithium aluminum titanium phosphate (LATP), lithium aluminum germanium phosphate (LAGP), garnets, sulfide glasses, sulfide electrolytes, argyrodites, Li-rich anti-perovskites, and Li-lanthanum perovskites.

4. The method as recited in claim 3, wherein the functional layer is formed without an additional tempering step.

5. The method as recited in claim 3, wherein the functional layer is compacted with the aid of a calendering process.

6. The method as recited in claim 1, wherein the lithium conducting salt together with the particles of the at least one ceramic material and the polymeric binder are applied to the carrier by deposition.

7. The method as recited in claim 1, wherein the carrier includes lithium and is formed as a lithium film.

8. The method as recited in claim 1, wherein an aerosol deposition method is used for the deposition of at least one of the at least one ceramic material and the polymeric binder, and wherein (i) the polymeric binder includes at least one of polyethylene oxide, polyethylene oxide derivatives, polyacrylates, and polyacrylate derivatives, and (ii) the ceramic material includes at least one of lithium aluminum titanium phosphate (LATP), lithium aluminum germanium phosphate (LAGP), garnets, sulfide glasses, sulfide electrolytes, argyrodites, Li-rich anti-perovskites, and Li-lanthanum perovskites.

9. The method as recited in claim 8, wherein the functional layer is formed without an additional tempering step.

10. The method as recited in claim 8, wherein the functional layer is compacted with the aid of a calendering process.

11. The method as recited in claim 8, wherein the lithium conducting salt together with the particles of the at least one ceramic material and the polymeric binder are applied to the carrier by deposition.

12. The method as recited in claim 8, wherein the carrier includes lithium and is formed as a lithium film.

* * * * *